United States Patent
Quinquis et al.

(10) Patent No.: US 6,335,921 B1
(45) Date of Patent: Jan. 1, 2002

(54) NETWORK GIVING LOCAL ACCESS TO MOBILE PHONES

(75) Inventors: Jean-Paul Quinquis; Olivier Roussel, both of Perros-Guirec; Laurent Hue, Lannion, all of (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 08/819,854

(22) Filed: Mar. 17, 1997

(30) Foreign Application Priority Data

Mar. 27, 1996 (FR) .......................................... 96 04089

(51) Int. Cl.[7] .......................... H04Q 7/00; H04L 12/28
(52) U.S. Cl. ...................................... 370/331; 370/395
(58) Field of Search ............................... 370/230, 349, 370/231, 341, 232, 329, 235, 397, 396, 395, 258, 310, 322, 331, 385, 399, 400, 404, 409, 465, 471; 455/436, 437, 444, 456

(56) References Cited

U.S. PATENT DOCUMENTS

| | | | |
|---|---|---|---|
| 5,487,065 A | * 1/1996 | Acampora et al. | 370/331 |
| 5,530,693 A | * 6/1996 | Averbuch et al. | 370/331 |
| 5,533,009 A | * 7/1996 | Chen | 370/17 |
| 5,533,020 A | * 7/1996 | Bryn et al. | 370/60.1 |
| 5,579,312 A | * 11/1996 | Regache | 370/60.1 |
| 5,592,470 A | * 1/1997 | Rudrapatna et al. | 370/320 |
| 5,629,928 A | * 5/1997 | Calvignac et al. | 370/237 |
| 5,633,868 A | * 5/1997 | Baldwin et al. | 370/331 |
| 5,659,544 A | * 8/1997 | La Porta et al. | 370/312 |
| 5,680,392 A | * 10/1997 | Semaan | 370/261 |
| 5,717,689 A | * 2/1998 | Ayanoglu | 370/349 |

FOREIGN PATENT DOCUMENTS

GB 0679042 A2 * 4/1995 ............ H04Q/7/24

OTHER PUBLICATIONS

Search Report for French Application 96/4089 and References cited therein.

* cited by examiner

Primary Examiner—Jason Chan
Assistant Examiner—Chiho Andrew Lee
(74) Attorney, Agent, or Firm—Michael Best & Friedrich LLP; J. Warren Whitesel (57) ABSTRACT

The present invention concerns a local mobile access network, of the kind that comprises a distribution network (RDL) formed by a plurality of nodes (NIE), each node (NIE) being connected to a concentrator (CTR) which is connected to at least one radio terminal (BR) designed to communicate with mobile units linked with said terminal (BR), at least one of said nodes (NIE) of said distribution network (RDL) being connected via routing equipment (PONT) [bridge] to a virtual channel switch (VCX).

This network is characterized therein that each virtual connection established between a mobile unit and said switch (VCX) is identified for the entire duration of the communication, no matter which radio terminal (BR) is connected to said mobile unit, by a unique virtual channel identifier (VCI) for the user cell and a unique virtual channel identifier (VCI) for the signalling cells and therein that, during the hand-over phases when a mobile unit is connected to two radio terminals (BR), said two terminals (BR) can exchange information which is then transmitted by cells carrying the signalling channel identifier (VCI) allocated to said mobile unit.

16 Claims, 6 Drawing Sheets

NETWORK GIVING LOCAL ACCESS TO MOBILE PHONES

The present invention concerns a local mobile access network.

Local mobile access networks are already known, reference is made for example to the patent document FR-A-2 714 559 which describes such a network consisting of a double terminal on which radio terminals are interconnected, for example, by the use of concentration nodes, to which other mobile stations can be connected.

In time, communications between mobile units or between a mobile unit and another source will not only be phonic but will require transport of representative data, e.g. still or animated images which justify the use of multi-output or even wideband networks. By nature, the ATM (Asynchronous Transfer Mode) technology ensures the transport of all kinds of information to various outputs.

A first object of the invention is to propose a local mobile access network which supports this ATM technology.

The growing demand for communication services between mobile units increases the traffic density that must be able to serve each radio terminal of the local access network. In order to ensure a better radio coverage in urban areas while taking the necessarily limited performances of said radio terminals into account, the coverage of each radio terminal must be reduced and microcellular networks proposed. Nevertheless, this poses the problem of a very significant multiplication of signalling procedures, notably when mobile units transfer from the radio coverage of one terminal to that of another terminal. This multiplication is also brought about by known phenomena, such as "from the street corner" or of "the passing truck". The Intercellular Automatic Transfers (TAI), still called "hand-over phase" in the technical field, generate processing procedures that may rapidly saturate the control devices of the terrestrial network.

The object of the invention is therefore to propose an access network based on the ATM technology that would enable one to solve this particular problem due to the capability of these networks to very flexibly and extremely quickly manage the support links identified by virtual connections.

A local mobile access network according to the invention is of the kind that comprises a distribution network made up of a plurality of nodes, each node being connected to a concentrator which is connected to at least one radio terminal designed to communicate with mobile units connected to said terminals, at least one of said nodes of said distribution network being connected, via routing equipment, to a virtual channel switch.

In order to attain the aforementioned objects, it is characterized therein that each virtual connection established between a mobile unit and said switch is identified for the entire duration of the communication, no matter which radio terminal is connected to said mobile unit, by a unique virtual channel identifier for the user cells and a unique virtual channel identifier for the signalling cells and therein that, during the hand-over phases, when a mobile unit is connected to two radio terminals, said two terminals can exchange information, which is then transmitted by cells carrying the signalling channel identifier allocated to said mobile unit.

According to another characteristic of the invention, said information which is transmitted between said two terminals during said hand-over phases is transmitted by cells carrying the signalling channel identifier allocated to said mobile unit and a virtual channel identifier corresponding to a common virtual channel defined in the distribution network according to point-to-point-with-fusion type of topology in the ascending direction and point-to-multipoint-with-diffusion in the descending direction.

According to another characteristic of the invention, the information that is transmitted between the said two terminals during the said hand-over phases is transmitted by cells carrying the signalling channel identifier allocated to said mobile unit and a virtual channel identifier corresponding to a common virtual channel defined in the distribution network according to virtual ring topology.

Thus, unlike the known mobile access networks, the processing procedures of the hand-over phases is distributed in the network.

According to another characteristic of the invention, each concentrator reaches the said virtual ring without passband reservation or, on the contrary, with passband reservation. In the latter case, said network is equipped with a control element for the passband designed to emit reservation cells corresponding to the output of the band to be reserved, a concentrator to emit a message capturing at least one of said cells and replacing it or them by one or several cells containing said message, a concentrator designed to receive a message replacing the cell or cells containing said message by one or several reservation cells.

According to another characteristic of the invention, each virtual connection established for a communication is, moreover, identified by a first virtual channel identifier when said communication is local and thus concerns two mobile units linked to one or more terminals of said network and by a second virtual channel identifier when said communication is incoming or outgoing and thus involves two speakers, of which only one is a mobile unit linked to one or more terminals of said network.

According to another characteristic of the invention, during hand-over phases, the two terminals linked to the mobile unit can make identification marks and erase said marks in the concentrators to which they are respectively connected.

According to another characteristic of the invention, servers that are accessible by permanent connections of the virtual channel type are interconnected to the routing equipment. Among said servers, one is a macrodiversity server active on each ascending virtual connection. Also included among said servers is a transcoder which carries out format transcoding of the cells having a virtual channel identifier identifying an incoming or outgoing communication.

The invention also concerns the architecture of said local access network. For example, said nodes of said distribution network are linked two by two in such a way so as to form a simple or double contrarotating ring. Said nodes of said distribution network are arranged in contraparallel double segments, one end of which is connected to the virtual channel switch. At least one of said segments may include sub-segments, one of the ends of which is connected to said segment via a repeater.

According to an advantageous characteristic, a local mobile access network according to the invention consists of a plurality of concentration nodes and of a switching and control centre, each concentration node consisting of a concentrator to which a plurality of radio terminals can be linked and a node connected to said concentrator, said node being a node of the distribution network, the said switching and control centre comprising the said routing equipment, said switch and at least one of the nodes of the distribution network. Said switching and control centre may, moreover, comprise at least one server.

The characteristics of the aforementioned invention, including others, will become clearer on reading the following description of an embodiment with reference to the attached drawings, showing:

FIGS. 5a and 5b show the structural details of the architectures shown in FIGS. 4a and 4b, FIGS. 6a and 6b, respectively, show a concentration node and a switching and control centre according to the invention, and FIGS. 7a, 7b, 8a and 8b, respectively, show topologies of local access networks according to the invention.

Figure 1:
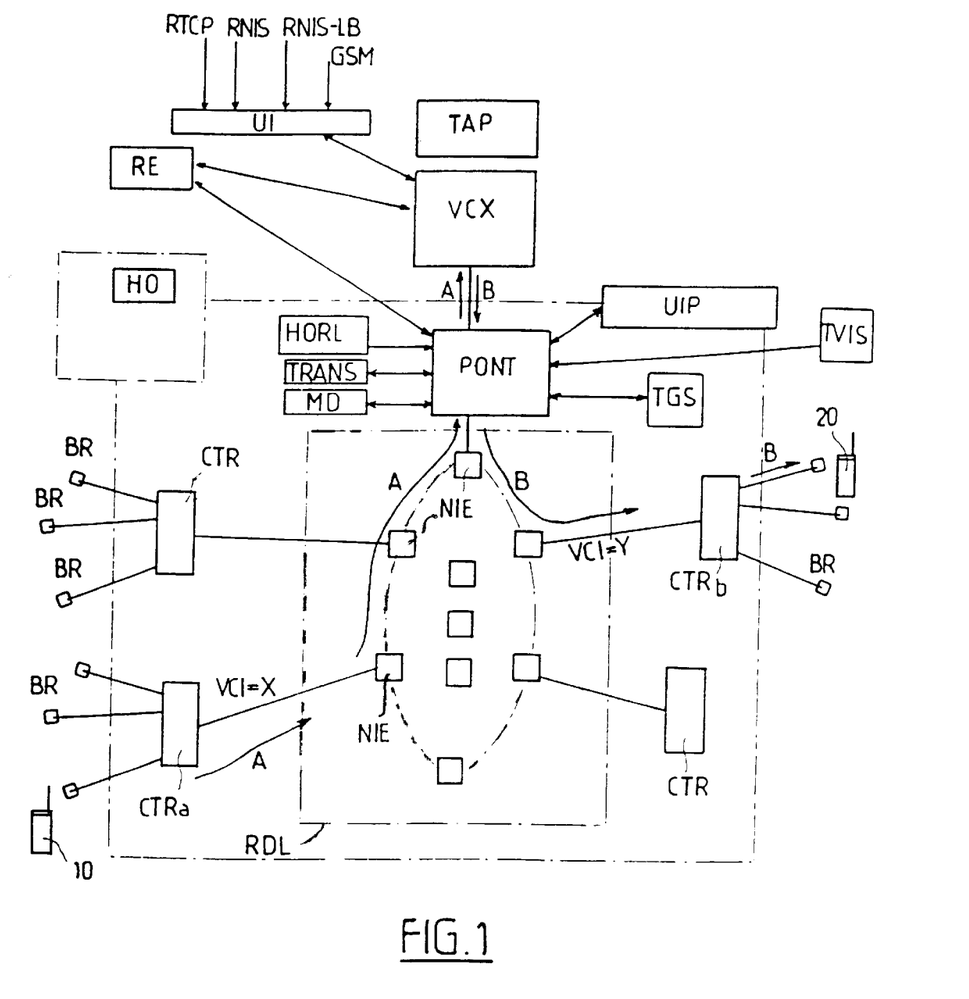
FIG. 1 is a synoptic diagram of a local access network according to the invention.

The local mobile access network RLAM described in FIG. 1 consists of a group of concentrators CTR to which a plurality of radio terminals BR are connected and which are respectively linked upstream to insertion/extraction nodes NIE of an internal distribution network RDL.

The nodes NIE are interconnected according to topologies that will be described below. As will be seen in the following, the internal network RDL ensures distribution and routing functions by virtual channels VP.

The RLAM network also comprises routing equipment PONT which is connected, on the one hand, to an insertion/extraction node NIE of the RDL network and, on the other hand, to servers and a VCX switch. The routing equipment PONT is designed to ensure interface between, on the one hand, the VCX switch and/or the servers and, on the other hand, the RDL distribution network. As will become clear in the following, this is like a virtual channel mixer VP.

The VCX switch is linked via an interworking unit UI to external networks of the RTCP, RNIS, RNIS-LB or GSM type, or directly to other external networks RE of the local mobile access network RLAM type that are identical to those of the invention. It ensures, in the user's plane, the switching of the virtual channels VC to ensure that, on the one hand, local connections are established between two mobile units linked to the same RLAM access network and, on the other hand, to make outgoing connections between an RLAM mobile network and a subscriber from an external network RE or to another network accessible through the interworking unit UI.

It is linked, for operation in the control plane, to a local or external call processing unit TAP.

It is noted that the VCX switch is not specific to an RLAM access network and can be operated with material available on the market.

The RLAM network also comprises a group of servers interconnected directly to the PONT routing equipment and is accessible through the RDI distribution network and the VCX switch by permanent ATM VP virtual channel connections.

These servers include an MD macrodiversity operator that is used during hand-over phases and an HO hand-over server that, as will be seen below, is distributed in the BR terminals or the CTR concentrators which is contrary to known solutions.

The other servers include, if it is necessary to comply with existing protocols, a transcoder server TRANS which performs adaptation operations between the ATM cells to make them compatible with the user level standards, a radio terminal BR synchronization signal distribution server HORL, a UIP protocol interworking unit ensuring possible adaptation between the call processing procedures seen by the mobile units and those seen by the VCX switch. The UIP unit is not required when there is total compatibility on the control level.

The RLAM network also comprises a monitoring and control terminal TGS that enables an operator to manage the local RDL network, that is to control its configuration, monitor its good running order, monitor traffic, measure the quality of the services, etc.

It is noted that it is also possible to provide a visualization terminal TVIS which, coupled to the monitoring and control terminal TGS, permits one to see the ongoing process of the RDL distribution network on a screen, such as a communication during the hand-over phases.

Each CTR concentrator carries out, in an ascending direction (mobile to network), the concentration of the flows coming from the radio terminals to which it is connected and, in a descending direction, carries out the demultiplexing of the flows coming from the RDL network which are destined for the BR terminals to which it is connected. As will be seen in the following, it also switches each virtual connection to the one or the other BR terminal based on the analysis of the field CVI of the headings of the ATM cells circulating in the RLAM network.

Each CTR concentrator also creates or erases each virtual connection under the control of a protocol regulated by the BR terminals to which it is connected.

Moreover, each CTR concentrator supervises its own good operation under the control of the monitoring and control terminal TGS.

It will be noted that the messages corresponding to the functions described above are transmitted by the RDL distribution network in the form of cells called OAM cells.

According to a characteristic of the invention, the virtual channel identifier can discriminate user traffic, internal signalling at the RLAM network level, end to end signalling, etc. The PONT routing equipment processes the connections at the virtual channel VP linking level and thus plays the role of a switch between the RDL distribution network, the VCX switch and the different MD, TRANS, UIP, TGS and HO servers. The switching of the ATM cells to one of the servers or to the VCX switch is therefore carried out by the PONT routing equipment based on the analysis of the VPI virtual channel identifier present in the field of the same name VPI of said cells.

It will be noted that it is possible to interconnect two RLAM networks like the one described here with the help of two PONT routing devices.

We will now de scribe the VP virtual channel management and identification techniques that carry the user's flows. It is noted that the signalling channel s that carry the signalling flux cells it not discussed at this point.

In FIG. 1, arrows A and B show the connection concept between two mobile units 10 and 20, this connection being a local one as long as it does not leave the RLAM network. The ascending part of the connection is shown by arrow A and is identified by a VCI virtual channel identifier, equal e.g. to X, while the VCI virtual channel identifier identifying the descending part of the connection shown by arrow B, is equal to Y. It is the VCX switch that translates the VCI channel identifiers for the communication.

The connection between the two mobile units 10 and 20 is initially made in the VCX switch and it can manoeuvre consecutively to the movements of the mobiles within the RDL network.

The control of the VCI identifiers is global in view of the fact that the VCI identifiers are translated in the VCX switch. All actual communications bear different VCI identifier numbers.

All communications are bidirectional. If we consider the upstream part of this communication, it then consists of one upstream connection and one downstream connection. These connections are identified by the same VCI identifier number whose value is, in our example, equal to X. On the other hand, as already mentioned above, the VCI identifier numbers have values of X and Y that differ at the two ends of a communication, whether it be local or outgoing.

The values X and Y of the VCI identifiers are allocated by the TAP server during the phase when the connection is established.

An identification number for the virtual channel VPI is allocated to a RLAM network. Thus, all local communications will be channelled into the VP channel having this identifier VPI. In the case where the mobile reception is outside of the RLAM network, the virtual channel identifier VPI will be different from that of the RLAM network.

According to an essential characteristic of the invention, these VCI and VPI identifiers are maintained for the entire duration of the communication, no matter what the terminals BR on which the two mobile units 10 and 20 are attached may be. Thus, the link between the ascending part of the connection and its descending part will remain established in the switch VCX for the entire duration of the communication.

Thus, the ascending part A of the connection is a point-to-point link which converges toward the switch VCX. It is identified by its VCI identifier in the concentrator CTRa and is channelled into the RDL distribution network and in the routing equipment PONT into a virtual channel VP having either the identifier VPI associated with the RLAM network, if it is a local connection, or another identifier VPI, if it is a connection going to an external network. With respect to the descending part B of the connection, it is diffused inside a diffusion shaft of the VP channels constructed on the RDL distribution network and identified by either the VPI identifier associated with the RLAM network, if it is a local network, or another VPI identifier, if it is an incoming connection from another network. The descending connections are filtered in each of the concentrators CTR on the basis of the VCI identifier fields carried by the cells in question.

The initial establishment of the connection is made by marking in the relevant concentrator CTRa for the ascending part A and in the CTRb concentrator for the descending part B. Since the mobile unit or units in question are always coupled to the same terminals, this marking is not changed. On the contrary, when a mobile unit moves and passes from a connection with one terminal BR to a new terminal BR, a new marking is carried out by the new terminal BR and in the concentrator CTR to which this new terminal BR is linked, in order to redirect the communication to this new terminal, even though the old terminal BR, by erasing the marking which had thus far existed in the concentrator CTR to which it is linked, freed the connection in this concentrator CTR. This marking is erased at the end of a hand-over procedure during which the mobile unit is reattached to two terminals BR and connected to two virtual channels VC. During this hand-over phase, the macrodiversity operator MD which differentiates these two virtual channels, for example, by their quality, only retains one.

Figure 2:
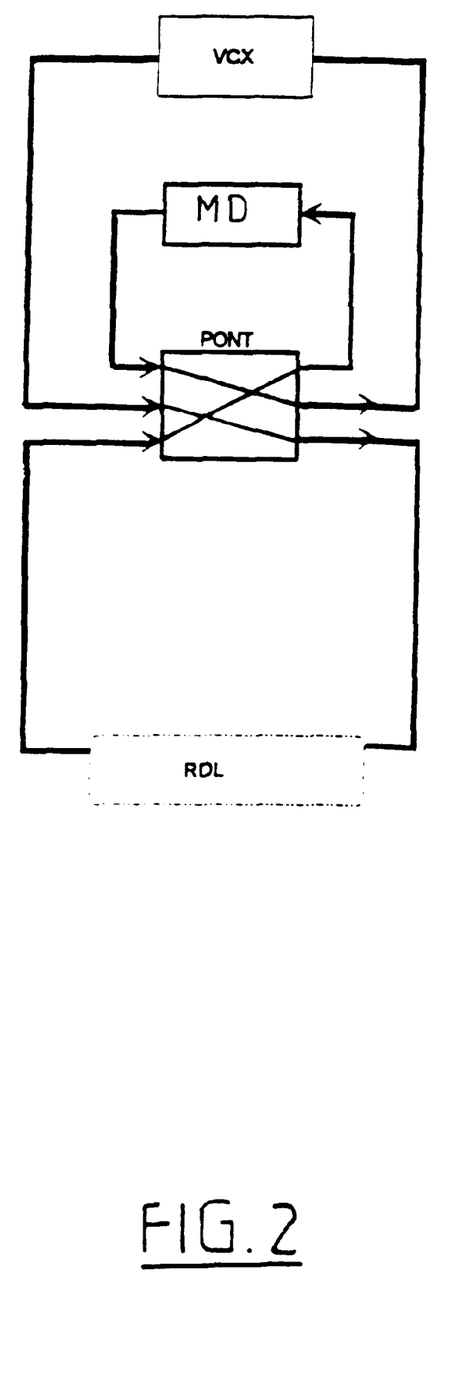
FIG. 2 illustrates the management of the mobility carried out with the routing equipment of a local access network according to the invention.

FIG. 2 shows a synoptic diagram illustrating the connection of the macrodiversity operator MD. In this case, this is a local communication between two mobile units attached to the same RLAM network. It can be seen in this FIG. 2 that the ascending link (mobile unit to switch) is directed, in the PONT equipment, toward the inlet to the MD operator, the outlet of which is directed, always in the PONT equipment, toward the switch VCX. With respect to the descending link (switch to mobile unit), it is direct. Thus, the MD operator is active only on the ascending links.

The mobile units are not necessarily compatible with the ATM technology. The ATM cells containing the user information coming from the mobile units in communication can very probably be different from those which have been standardized for the transport of the telephone in the future wideband network.

The coding standards can be different, for example, due to a compression of data which is more important for radiotelephony than for the ATM network.

The difference can also come from the fact that the ATM macrodiversity processing necessitates that the complementary information be inserted into the cells, for example, coding of the quality of the contents measured from the radio propagation criteria, sequence numbers enabling the comparison on homologous cells, etc.

It is noted that these differences are insignificant and the connection remains inside the RLAM network, i.e. when the communication is established between 2 mobile units which are within the zone covered by a single RLAM network.

In the situation in which the connection must leave the local network RLAM, by switch VCX, to go to another external ATM network, the problem of interoperability arises. Thus, it is absolutely necessary that the cells which circulate in the RLAM network be made compatible with the standardized structure of the ATM network.

Figure 3A:
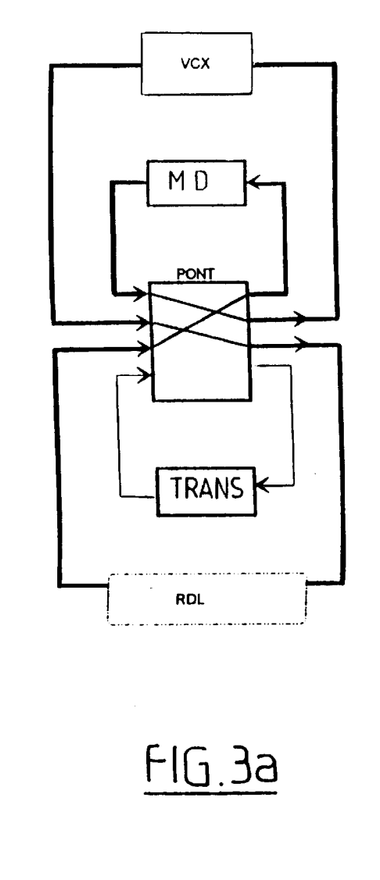
FIGS. 3a to 3c illustrate the transcoding carried out with the routing equipment of a local access network according to the invention.
Figure 3B:
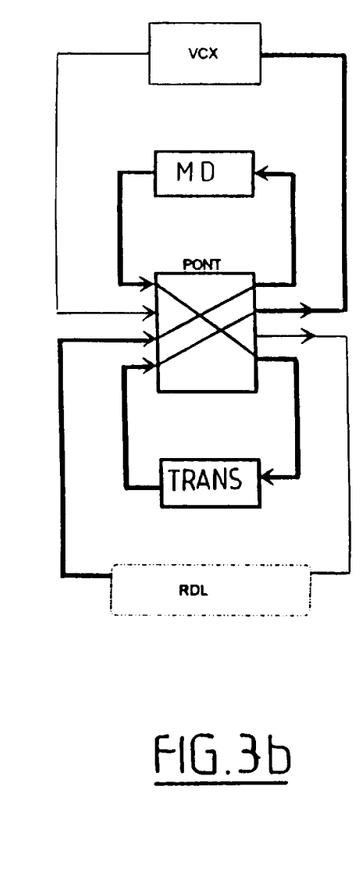
Figure 3C:
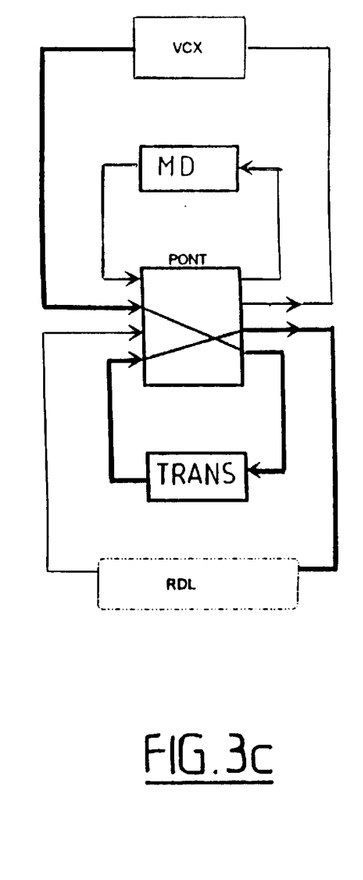

To accomplish this, a transcoder TRANS is provided which is connected to the PONT routing equipment, the operation of which is made clear with respect to FIGS. 3a to 3c. The macrodiversity operator MD is also shown on these FIGS. 3a to 3c.

FIG. 3a concerns a local communication and shows the connections, respectively, in ascending direction (mobile unit to switch) and in descending direction (switch to mobile unit). As can be seen, the connections made in the PONT routing equipment are not passed through by the transcoder TRANS.

FIGS. 3b and 3c relate to outgoing communications, respectively, in ascending direction (mobile unit to switch) and in descending direction (switch to mobile unit). As can be seen, for the ascending direction, the connections in the PONT routing equipment are made in such a way that the ascending connection is switched at the inlet of the MD macrodiversity operator, the outlet thereof to the inlet of the transcoder TRANS, the outlet of the transcoder TRANS being switched at the outlet of the PONT routing equipment which is linked to switch VCX. For the descending direction, the connections in the PONT routing equipment are made in such a way that the descending connection is switched at the inlet of transcoder TRANS, the outlet of transcoder TRANS being switched at the outlet of the PONT routing equipment which is linked to the RDL network. It will be noted that the descending connection does not pass through there nor in the macrodiversity operator MD.

When passed through by the transcoder TRANS, the cells are subjected to a conversion from the external network format to the local network format and vice versa.

The choice of crossing or not crossing the transcoder TRANS is made by the field analysis contained in the heading of the ATM cells having the virtual channel identifier VPA, since the value taken from this identifier determines whether or not these cells belong to a local traffic user or to an outgoing (or incoming) traffic user.

Figure 4A:
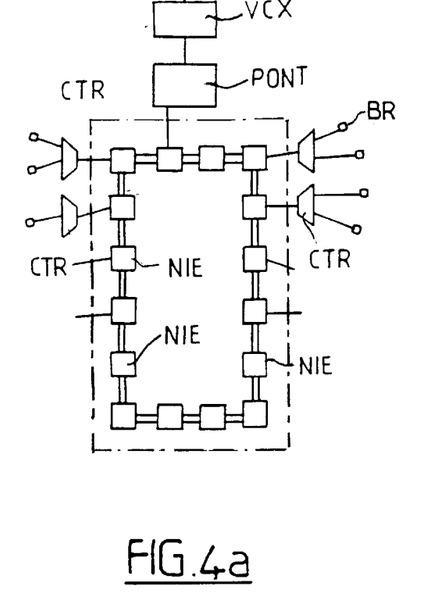
FIGS. 4a and 4b, respectively, show different architectures of local access networks according to the invention.
Figure 4B:
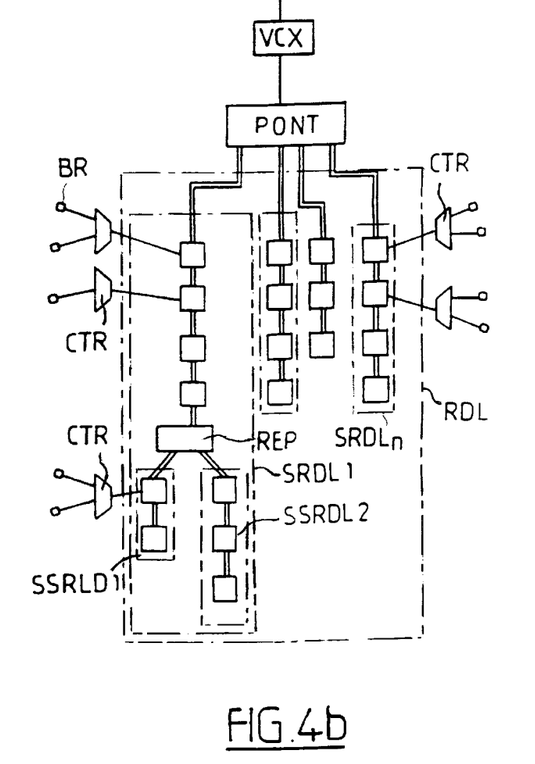

FIGS. 4a to 4b show two different topologies of the distribution network RDL. These network topologies are respectively in a double, contrarotating ring loop and in a double bus segment. These basic networks are developed about a same basic entity, i.e. an insertion/extraction node NIE arranged according to different topologies, which enables one to provide maximum flexibility for on-site installation of a radio terminal BR interconnecting structure and makes it possible for those in charge of network engineering to better adapt the physical architecture of the distribution network RDL to the topography of the sites.

Moreover, these basic networks can be combined and assembled in various ways to construct, on request, any type of distribution network architectures which improves their flexibility for implementation.

Figure 5A:
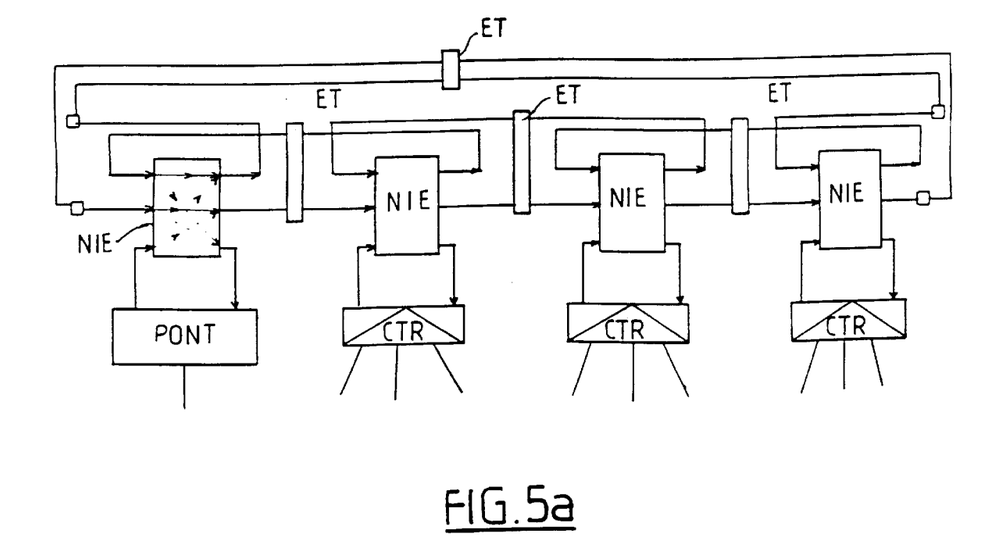

In FIG. 4a, the insertion/extraction nodes are interconnected in such a way that they form a double, contrarotating ring which is shown in detail in FIG. 5a.

In FIG. 5a, the double contrarotating ring shown consists of four insertion/extraction nodes NIE. As can be seen in this Fig., each NIE node has three inlets, two of which belong respectively to the first and second rings, and the third being connected to the outlet of a concentrator CTR or, for one, to the outlet of the PONT routing equipment. It also comprises three outlets, one belonging to the first ring is connected to the corresponding inlet of the next NIE node, another one belonging to the second ring is connected to the corresponding inlet of the preceding NIE node and the last of which is connected to the inlet of a concentrator CTR or, for one of the NIE nodes, to the inlet of the PONT routing equipment. The various possible connections between the inlets and outlets of a NIE node of such a RDL network are shown by arrows in the first NIE node.

It will be noted that the transmission equipment ET assures the quality of the transfers when the NIE nodes are geographically distributed.

It will also be noted that it could be installed in a single ring.

In FIG. 4b, the distribution network RDL is subdivided into sub-networks SRDL1 to SRDLn, respectively connected to the PONT routing equipment. Each sub-network SRDL1 consists of a segment of NIE nodes to which concentrators CTR are respectively linked. Certain sub-networks (here, the sub-network SRDL1) can also be divided into sub—sub-networks SSRDLj, the tops of which are respectively linked to a repeater REP at the end of a segment.

Figure 5B:
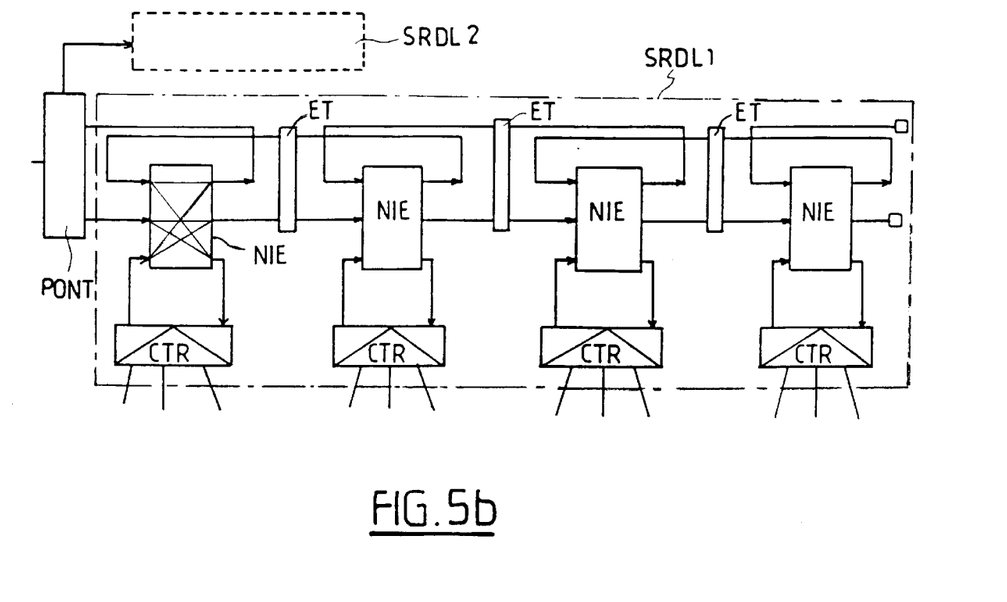

In FIG. 5b, two segments SRDL1 and SRDL2 of a distribution network RDL are shown, only one of which SRDL1 is shown in greater detail. The latter comprises four nodes NIE which are interconnected so as to form two contraparallel buses. The top of each segment is connected to the PONT routing equipment. As in FIG. 5a, the possible connections are shown in the first NIE node. This network differs from the one shown in FIG. 5a in that it is a type of open bus. In this type of an RDL network, the PONT routing equipment passes through the cells via virtual channels VP between the different segments SRDL1. It will be noted that the SRDL1 segments can be of different lengths.

One of the advantages of the segmental distribution network is the fact that it can be expanded both in transverse direction by adding segments and in longitudinal direction by increasing the number of insertion/extraction nodes per segment. It will be recalled that a segment can itself be divided into sub-segments by inserting an REP repeater node.

It is noted that other combinations linking the loop model and the segmental model can also be envisaged.

It is also noted that, due to the fact that the routing of information on the RDL distribution network is carried out through virtual channels VP, respectively allocated to the user traffic and to signalling, the equipment at the ends of the local network, namely the mobile units, radio terminals BR and the switch VCX, completely ignore the physical topology of the distribution network RDL. Thus, the TAP call processing units assign a couple of VPI channel identifiers and VCI channel identifiers to a virtual connection, no matter what the initial topology of the distribution network RDL is and no matter what modifications may have been made to the structure and configuration.

The configuration of the virtual channels VP of a distribution network RDL is advantageously accomplished by using the RLAM network. This configuration consists of creating virtual connections VP which will support the signalling channels and the channels in which the traffic users will be routed. These channels are point-to-point in the ascending direction from the concentrators CTR to the PONT routing equipment to fuse in the latter and point-to-multipoint in the descending direction so as to diffuse toward the concentrators CTR.

By means of appropriate and specific commands on the control terminal TGS, the administrator of the RLAM network can modify this configuration. This can be necessary, in particular, in case of modifications or equipment breakdown in the RDI network.

According to an embodiment of the invention, the architecture of a RLAM network is outlined in two types of equipments, called NCT concentration node and CCG switching and control centre in the following, respectively shown in FIGS. 6a and 6b.

Figure 6A:
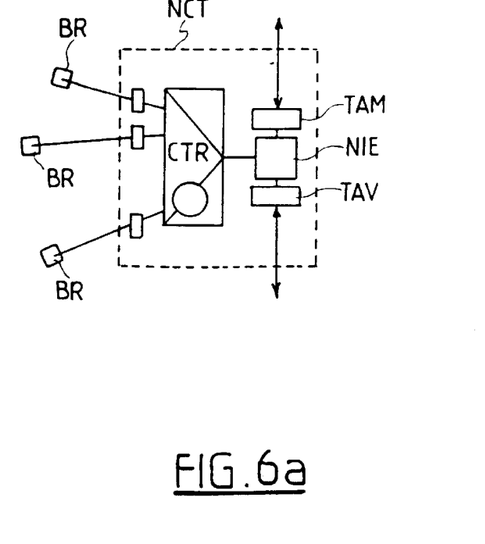

The NCT concentration node shown in FIG. 6a consists of a concentrator CTR, a NIE node connected, on the one hand, to the concentrator CTR and, on the other hand, to the upstream and downstream TAV and TAM transmission equipment. The structures of this equipment and of the NIE node depend on the topology of the distribution network implemented. An NCT concentration node is advantageously self-contained in terms of power and can be administered by remote control via the RDI distribution network, from the CCG switching and control centre.

Figure 6B:
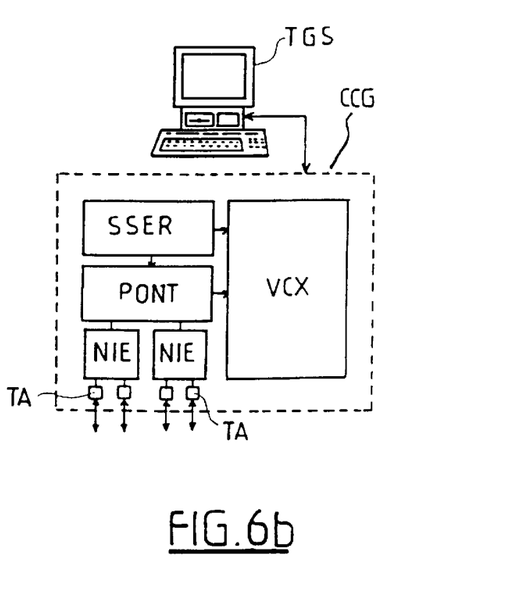

The CCG switching and control centre shown in FIG. 6b consists of the aforementioned servers, connected to the PONT routing equipment and to the switch VCX. The PONT routing equipment is also connected to the switch VCX. It also includes two NIE insertion/extraction nodes, respectively connected upstream to the PONT routing equipment and downstream to the TA transmission equipment. It is noted that a CCG centre is only for an RML network. It is noted that the number of NIE nodes depends on the topology of the distribution network, according to which it will have one or several SRDL1 sub-networks.

The TGS control and monitoring terminal connected to the CCG centre is also shown. These two pieces of equipment are advantageously situated physically at the same location.

It will be noted that two types of equipment result from the design of the RLAM network, namely an NCT concentration node and a CCG switching and control centre, that the RDL distribution network is split geographically since the NIE insertion/extraction nodes of which it consists are present at the same time in the NCT concentration nodes and the CCG switching and control centre.

Figure 7A:
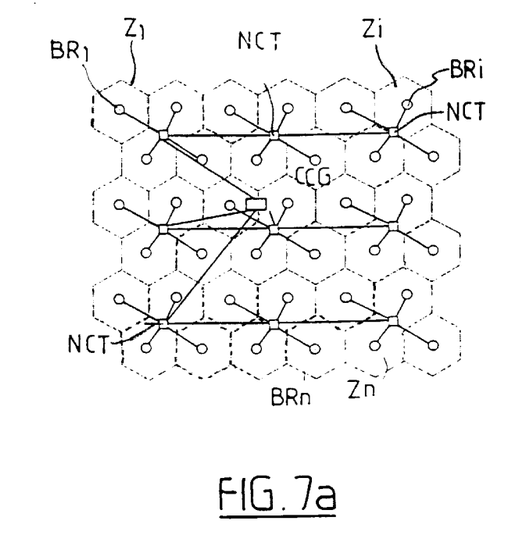
Figure 7B:
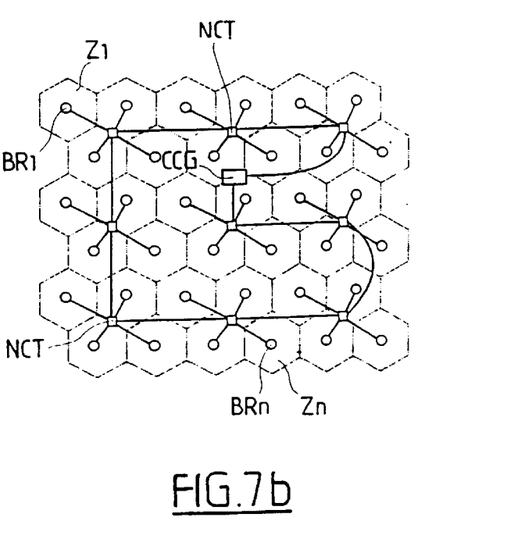

The geographical zones Zi covered by adjacent radio terminals BRi, as well as the connections between these radio terminals BRi and NCT concentration nodes are shown in FIGS. 7a and 7b in the form of hexagons. By way of example, it is considered that the CTR concentration nodes are connected to four BR terminals. It is noted that an RDL distribution network with three segments is shown in FIG. 7a and a looped RDL distribution network is shown in FIG. 7b.

These types of networks are, for example, adapted to cover the urban areas where potential users are relatively homogeneous.

Figure 8A:
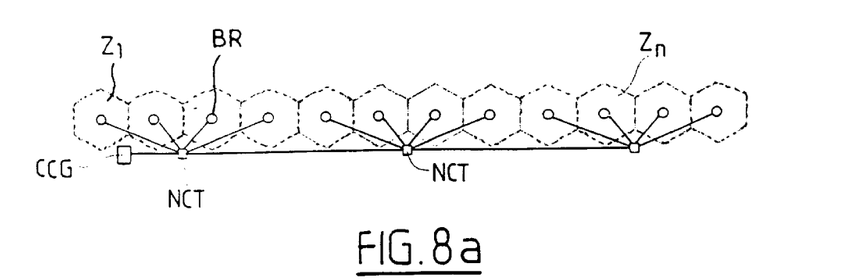
Figure 8B:
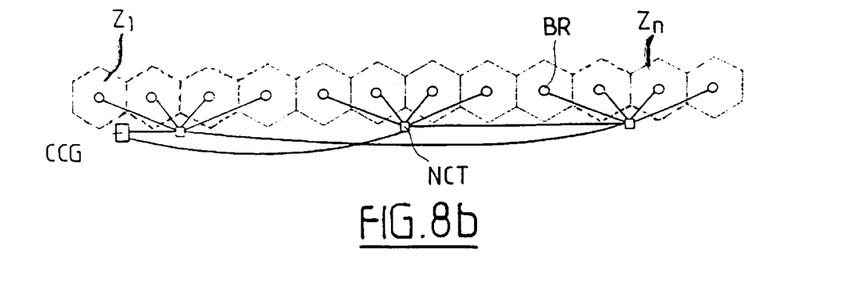

Geographic zones Z in which form linear regions between them for a segmental RDL distribution network and for a looped RDL distribution network, respectively, are shown in FIGS. 8a and 8b. These types of networks are, for example, adapted for covering areas such as circulating channels passing through low-power areas.

We shall now describe the control of the mobility in the course of phases during which a mobile unit passes through an area covered by a terminal BR to another terminal BR. These phases are called "hand-over" phases in the technical field.

According to the invention, the control of the mobility is distributed, which is contrary to conventional networks in which it was centralized. This control of the mobility consists essentially, on the one hand, of a dialogue between the former BR terminal and the new BR terminal to which the mobile unit is connected, in particular for exchanging radio contexts and ATM relating to the communication in progress and, on the other hand, for marking and erasing the marking, by the BR terminals, of CTR concentrators to which they are linked, as was previously explained.

To ensure this dialogue, two mechanisms are set up, one is the implementation of a common broadcast channel and the other is the implementation of a shared virtual ring.

We shall explain the implementation of a common broadcast channel.

The request coming from a BR terminal via its concentrator CTR rises point-by-point to the PONT routing equipment by a single channel identified by a given VPI channel number. The request is then transmitted with the VPI identifier which identifies the common channel and with a virtual VCI channel identifier which corresponds to the signalling channel allocated to the mobile unit which is in the process of passing from one terminal to another.

It is noted that the VCI virtual channel carries the signalling cells of the communication in question and is assigned to said communication at the moment that it is established. It remains unchanged for the course of the communication.

The PONT routing equipment then transmits this request to the RDL distribution network or the sub-networks forming the RDL distribution network to all of the CTR concentrators. The latter perform a filtering function of the request on the basis of the signalling VCI virtual channel identifier. The only CTR concentrator which lets the request pass is the one in which the connection carrying the signalling VCI identifier has already been established. In actuality, there are two CTR concentrators which will let the request pass: the destination concentrator to which the former BR terminal is attached, but also the transmitting concentrator to which the new BR terminal is attached. It will be noted that the new terminal receives the message which it sent as an echo.

The responding procedure of the prior BR terminal to the new one is identical to that which is going to be explained.

The messages which are transmitted by this common channel are, for example, carried by a single cell which contains the address of the destination which is identified by the signalling number VCI as well as the nature of the function to be performed or of the request made.

It is noted that the fact that the message sent by the transmitting terminal BR carries a VCI virtual channel identifier corresponding to the signalling channel assigned to the mobile unit, enabling it to reach the previous terminal B to which it was previously connected since, in the hand-over phase, the support channel is established at the same time on the new and on the prior terminal.

It is again noted that, during this entire dialogue process, only the processors of the BR terminals are queried, which differs from a centralized solution like the PONT equipment which would necessitate that a single processor processes all of the requests of hand-overs in progress. The results is that it is possible to process more requests at the same time since they can be processed simultaneously.

In the method of the common virtual ring channel, the point is to interconnect the concentrators 2 by 2 by means of virtual channels VP established in the RDL distribution network having a virtual ring topology. The ATM cells containing the information required for the dialogue between the concentrators CTR and between the terminals BR, via their CTR concentrators, circulate on this VP virtual channel until the destination is found which immediately withdraws the support. Any CTR concentrator whatsoever can use this channel by inserting a monocellular message into it which contains the address of the recipient (identified by the signalling VCI virtual channel identifier) and the nature of the function to be performed or the request made.

If no passband is reserved, each CTR concentrator has access to the common ring channel by inserting their messages with the likelihood that they might be lost or that they bring about the loss of other cells in the case of overloads on the internal links of the RDL distribution network.

On the contrary, it is possible to reserve a minimum band to enable the dialogue to take place between concentrators CTR, e.g. by means of a control device OG connected to the PONT routing equipment.

This band which is shared by the CTR concentrators guarantees them a quality of service measured at the rate of loss and delays in transfer. Moreover, it assures that the other services will not be affected in case of overloads.

The function of the OG control element is to transmit on the common VP channel a flow of specific cells, also reserved cells, the output corresponding to the band to be reserved. These cells are ring specific and carry, to do so, a preset virtual circuit identifier VCI. The CTR concentrators can then identify these cells and pick up for transmission, at their place, their message on the VP virtual ring channel. Thus, to transmit a message, a CTR concentrator waits to arrive at such a reserved cell to insert it there, in that place, a cell of its message. On the other hand, when a message is received, the CTR concentrator replaces it by a reserved cell so that another concentrator (CTR) can pick up to transmit its message.

As in the case of a common broadcast channel, the message transmitted is identified by a couple of VPI virtual channel identifiers assigned to the common channel and VCI virtual channel assigned to the mobile signalling channel in question.

The disadvantage of the option with the resources management is that it necessitates a processing in the concentrators CTR since the latter do not simply have to filter the messages on the basis of the VCI identification numbers. Morever, when transmitting a message on the virtual ring, the CTR concentrators must replace a cell reserved by a cellular message. Also, when picking up a message, they must replace a cell message by a reserved cell. These processes necessitate a procedure which would slightly lower the performance of this technique.

We claim:

1. A local mobile access network comprising: a virtual channel switch (VCX); said virtual channel switch (VCX) being connected to at least one external network (RE, UI); a routing equipment (PONT), a plurality of nodes (NIE); said switch (VCX) being connected via said routing equipment (PONT), to one node (NIE) among said plurality of nodes (NIE) which are interconnected to form a distribution network (RDL); at least one concentrator (CTR); a plurality of radio terminals (BR); a plurality of mobile units; each of said nodes (NIE) being connected to said at least one concentrator (CTR) having at least one of said radio terminals (BR) connected thereto for communicating with said mobile units, wherein all virtual connections established between said mobile units and said switch (VCX) are identified by a common and unique virtual path identifier (VPI) corresponding to a virtual path connecting all of said radio terminals (BR) with the switch (VCX) according to a point-to-point fusion topology in an uplink direction and a point-to-multipoint diffusion topology in a downlink direction; a connection between a mobile unit and said switch (VCX) being identified for an entire period of communication by a virtual channel identifier (VCI) attributed during a call establishing phase and marked in said concentrator (CTR) during said phase; virtual connections between two of said mobile units attached to said radio terminals of said network being identified by a first common virtual path identifier; all of the connections between said mobile unit attached to one of said radio terminals of said mobile network and said external network being identified by a second common virtual path identifier; a third virtual path identifier for signalization exchange of cells between said mobile units attached to said network and the switch; each signalization cell being identified by a virtual channel identifier (VCI) for each mobile unit and attributed thereto during a localization phase of said mobile by said network; and further wherein during a hand-over phase while a mobile unit is attached to two of said terminals (BR), said two terminals exchanging information which is carried by cells having the virtual channel identifier (VCI) of a signaling channel allocated to said mobile unit and the common virtual path identifier (VPI) defined in distribution network (RDL), according to point-to-point fusion topology in the uplink direction a point-to-multipoint with diffusion topology in the down link direction.

2. A local mobile area network according to claim 1 wherein information which is transmitted between said two terminals during said hand-over phase is conveyed by cells having an identifier (VCI) of the signaling channel assigned to said mobile unit and an identifier of the virtual channel (VPI) corresponding to a defined common virtual channel in the distribution network (RDL) according to a point-to-point fusion in an ascending direction and a point-to-multipoint with diffusion in a descending direction.

3. A local mobile area network according to claim 1, wherein information which is transmitted between said two terminals during said hand-over phase are conveyed by cells having the identifier (VCI) of the signaling channel assigned to said mobile unit and an identifier of the virtual channel (VPI) corresponding to a defined common virtual channel in the distribution network (RDL) according to a virtual ring topology.

4. A local mobile access network according to claim 3, wherein each concentrator (CTR) assigns a virtual ring with a reservation of the passband to a minimum band.

5. A local mobile access network according to claim 1 wherein each virtual connection established for a communication is further identified by a first identifier of the virtual channel (VPI) when said communication is local, said local communication comprising two mobile units connected to at least one terminal (BR) of said network and by a second identifier of the virtual channel (VPI) when said communication is outgoing or incoming and concerns two speakers, only one of which is a mobile unit connected to said at least one terminal (BR) of said network.

6. A local mobile access network according to claim 1 further comprising server means accessible via virtual channel (VP) permanent links interconnected to the routing equipment (PONT).

7. A local mobile access network according to claim 6, further comprising a macrodiversity server (MD) included among said server means said microserver being active on each ascending virtual connection.

8. A local mobile access network according to claim 1, wherein said nodes (NIE) of said distribution network (RDL) are connected two by two to form at least a single contrarotating ring.

9. A local mobile access network according to claim 8, wherein said nodes (NIE) of said distribution network (RDL) are arranged in double, contraparallel segments, one end of which is connected to the virtual channel switch (VCX).

10. A local mobile access network according to claim 9 wherein, at least one of said segments comprises sub-segments, one end of which is connected to said segment via a repeater (REP).

11. A local mobile access network according to claim 1 wherein there are a plurality of concentration nodes (NCT) and a switching and control center (CCG), each of said concentration nodes (NCT) being formed by a concentrator (CTR) to which a plurality of radio terminals (BR) can be connected and a node (NIE) connected to said concentrator (CTR), said node (NIE) being anode of the distribution network (RDL), said switching and control centre (CCG) including said routing equipment (POINT), said switch (VCX) and at least one node (NIE) of the distribution network (RDL).

12. A local mobile access network according to claim 11 wherein said switching and control center (CCG) comprises at least one server.

13. A local mobile access network comprising: a virtual channel switch (VCX), said virtual channel switch (VCX) being connected to at least one external network (RE, U1); a routing equipment (PONT); a plurality of nodes (NIE); said switch (VCX) being connected, via said routing equipment (PONT), to one node (NIE) among said plurality of nodes (NIE) which are interconnected to form a distribution network (RDL); at least one concentrator (CTR); a plurality of radio terminals (BR); a plurality of mobile units; each of said nodes (NIE) being connected to said at least one concentrator (CTR) having at least one of said radio terminals (BR) connected thereto for communicating with said mobile units, wherein all virtual connections established between said mobile units and said switch (VCX) are identified by a common and unique virtual path identifier (VPI) corresponding to a virtual path connecting all of said radio terminal (BR) with the switch (VCX) according to a point-to-point fusion topology in an uplink direction and a point-to-multipoint diffusion topology in a downlink direction; a connection between a mobile unit and said switch (VCX) being identified for an entire period of communication by said virtual channel identifier (VCI) attributed during a call establishing phase and being marked in said concentrator during said phase, all connections between two of said mobile units attached to said radio terminals of said network being identified by a first common virtual path identifier; all of the connections between said mobile unit attached to one of said radio terminals of said mobile network and said external network being identified by a second common virtual path identifier; a third virtual path identifier for signalization cells exchange between said mobile units attached to said network and the switch; each signalization cell being identified by a virtual channel identifier (VCI) for each mobile unit and attributed thereto during a localization phase of said mobile unit by said network, wherein during a hand-over phase while a mobile unit is attached to two of said terminals (BR), said two terminals exchanging information which is carried by cells having the virtual channel identifier (VCI) of signaling channel allocated to said mobile unit and the common virtual path identifier (VPI) defined in the distribution network (RDL), according to point-to-point fusion topology in the uplink direction a point-to-multipoint with diffusion topology in the down link direction, information which is transmitted between said two terminals during said hand-over-phase being conveyed by cells having the identifier (VCI) of the signaling channel assigned to said mobile unit and an identifier of the virtual path (VPI) corresponding to a defined common virtual channel in the distribution network (RDL) according to a virtual ring topology, each concentrator (CTR) assigning a virtual ring without reserving the passband.

14. A local mobile access network comprising a virtual channel switch (VCX), said virtual channel switch (VCX) being connected to at least one external network; (RE, U1) a routing equipment (PONT); a plurality of nodes (NIE); said switch (VCX) being connected via said routing equipment (PONT), to one node (NIE) among said plurality of nodes (NIE) which are interconnected to form a distribution network (RDL); at least one concentrator (CTR); a plurality of radio terminals (BR); a plurality of mobile units; each of said nodes (NIE) being connected to said at least one concentrator (CTR) having at least one of said radio terminals (BR) connected thereto for communicating with said mobile units, wherein all virtual connections established between said mobile units and said switch (VCX) are identified by a common and unique virtual path identifier (VPI) corresponding to a virtual path connecting all of said radio terminals (BR) with the switch (VCX) according to a point-to-point fusion topology in an unlink direction and a point-to-multipoint diffusion topology in a downlink direction; a connection between a mobile unit and said switch (VCX) being identified for an entire period of communication by said virtual channel identifier (VCI) attributed during a call establishing phase and being marked in said concentrator during said phase, all connections between two of said mobile units attached to said radio terminals of said network being identified by a first common virtual path identifier; all of the connections between said mobile unit attached to one of said radio terminals of said mobile network and said external network being identified by a second common virtual path identifier; a third virtual path identifier for signalization cells exchange between said mobile units attached to said network and the switch; each signalization cell being identified by a virtual channel identifier (VCI) for each mobile unit and attributed thereto during a localization phase of said mobile unit by said network, wherein during a hand-over phase while a mobile unit is attached to said two terminals (RR) said two terminals exchanging information which is carried by cells having the virtual channel identifier (VCI) of a signaling channel allocated to said mobile unit and the common virtual path identifier (VPI) defined in the distribution network (RDL), according to point-to-point fusion topology in the uplink direction a point-to-multipoint with diffusion topology in the down link direction, information which is transmitted between said two terminals during said hand-over phase being conveyed by cells having the identifier (VCI) of the signaling channel assigned to said mobile unit and an identifier of the virtual path (VPI) corresponding to a defined common virtual channel in the distribution network (RDL) according to a virtual ring topology, each concentrator (CTR) assigning a virtual ring with a reservation of the passband to a minimum band, a control unit for transmitting reservation cells at a rate corresponding to a band to be reserved, a concentrators (CTR) which has a message to transmit picking up one or more of said cells and replacing it or them by one or several cells containing said message and a concentrator (CTR) which has a message to receive replacing said cell or cells containing said message by one or more reservation cells.

15. A local mobile access network according to either of the claims 1 and 14, wherein each of said terminals is provided with means for making markings and erasing said marking in the concentrators (CTR) to which it is connected during a hand-over phase in which a mobile unit is connected thereto and to an other terminal.

16. A local mobile access network according to claim 15 further comprising a transcoder (TRANS) which is provided among said server means for transcoding a format of cells having a virtual channel identifier identifying an outgoing or an incoming communication.

\* \* \* \* \*